Oct. 21, 1952     J. L. HUNTER ET AL     2,614,956
METHOD OF FABRICATING PLASTIC VENETIAN BLIND LADDERS
Filed Nov. 4, 1947
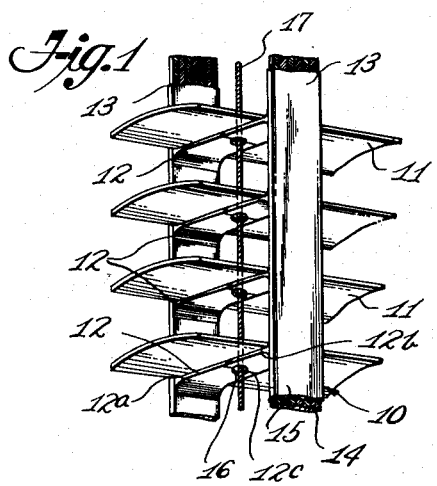
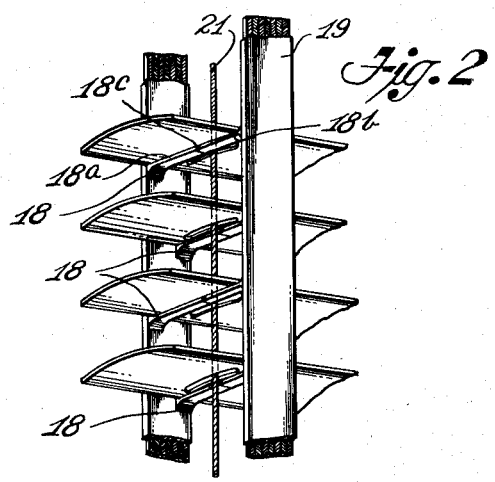
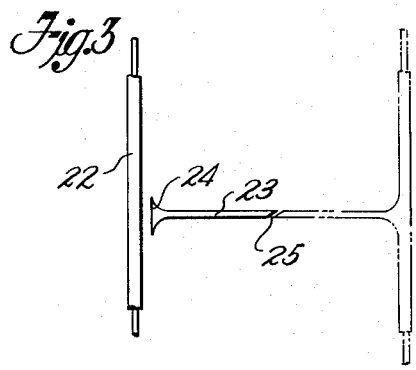
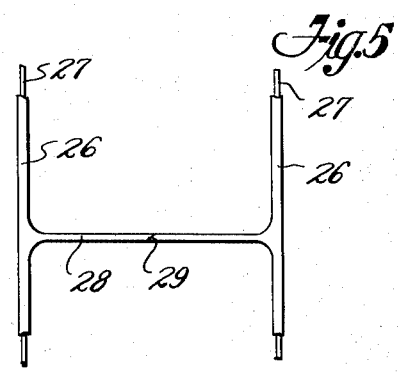
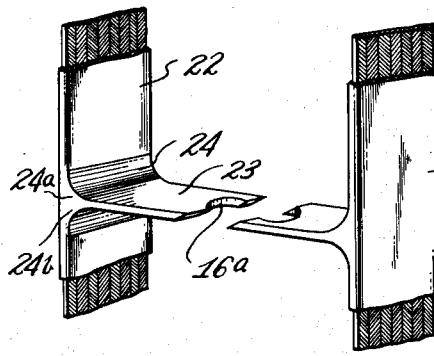
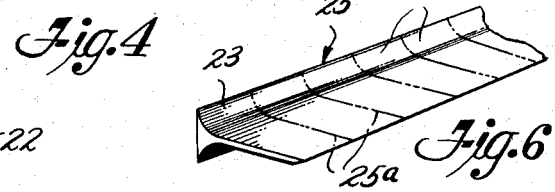
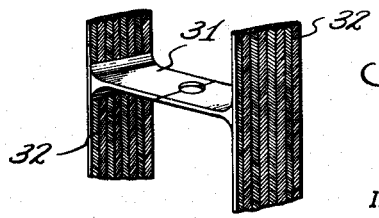
INVENTORS
JOSEPH L. HUNTER
THOMAS A. MARTIN
BY Harold W. Mattingly
Attorney Patented Oct. 21, 1952

2,614,956

UNITED STATES PATENT OFFICE 2,614,956

METHOD OF FABRICATING PLASTIC VENETIAN BLIND LADDERS

Joseph L. Hunter and Thomas A. Martin, Riverside, Calif., assignors, by mesne assignments, to Hunter Douglas Corporation, Riverside, Calif., a corporation of Delaware Application November 4, 1947, Serial No. 784,030

2 Claims. (Cl. 154—116)

1

Our invention relates to Venetian blinds, and has particular reference to plastic types of Venetian blind ladders and to the methods of constructing them.

The use of organic plastic materials or plastic-coated fabric is increasingly important in the manufacture of Venetian blind ladders. Not only does the plastic material present a smooth surface that collects little dust, but it completely waterproofs and coats the fabric so that the entire Venetian blind may be cleaned by dipping in water or other cleaning solution without the necessity of disassembling the slats from the ladders. There are fabrication problems, however, in attaching cross bars to the vertical tapes, inasmuch as there is considerable flexing of the cross bars at the juncture with the vertical tape. Accordingly the attachment of cross bars by merely gluing the tips of a strip of plastic to a pair of vertical tapes results in either failure of the cross bar at the junctures or in the cross bar tearing loose from the vertical tapes.

We have discovered that the life of plastic cross tapes may be greatly increased by the provision of a separate fillet at the juncture with the vertical tapes, as disclosed in the copending application of Joseph L. Hunter, Serial No. 730,777, filed February 25, 1947, now abandoned. The concentration of stresses at the juncture of the cross bar with the vertical tape is apparently eliminated by this fillet construction, and cross tape failure and breaking of the bond is substantially reduced or eliminated.

Our present invention utilizes this fillet construction and in addition provides a sectional or fractional cross tape. Thus in practicing the present invention, cross bars of one-half the normal length may be molded integrally with the vertical tape, or may be separately attached thereto. Two such subassemblies of vertical tapes and half cross bars may thereafter be brought together and the cross tapes welded, cemented, or otherwise bonded together at their tips to form a completed ladder.

It is therefore an object of our invention to provide an improved Venetian blind ladder employing plastic vertical tapes and plastic cross bars.

Another object of our invention is to provide a method of forming plastic ladders.

Another object of our invention is to provide a method of forming plastic ladders employing sectional cross bars.

Still a further object of our invention is to provide a method of fabricating plastic cross bars to vertical tapes.

2

Another object of our invention is to provide a plastic type of ladder construction for Venetian blinds employing sectional plastic cross tapes.

Another object of our invention is to provide plastic cross tapes having integral fillets formed thereon for long life and great durability.

Still another object of our invention is to provide plastic cross tapes that are thin and flexible and have an integral base that is wide.

Other objects and advantages of our invention will be apparent in the following description and claims, considered together with the accompanying drawings, in which:

Fig. 1 is a perspective view of one end of a Venetian blind showing a ladder incorporating our invention and representative portions of slats supported on the ladder;

Fig. 2 is a perspective view similar to Fig. 1 but illustrating the use of narrow staggered cross bars incorporating our invention;

Fig. 3 is a side view of a vertical tape and cross bar provided in accordance with our invention and showing the method of assembly and attachment;

Fig. 4 is an enlarged perspective view of a full width cross bar attached to a length of vertical tape;

Fig. 5 is a side view of a segment of Venetian blind ladder incorporating our invention and illustrating cross bars integrally molded to the vertical tapes;

Fig. 6 is a length of extruded cross bar plastic; and

Fig. 7 is a modified form of our invention as applied to bare fabric vertical tapes.

Referring to Fig. 1, a Venetian blind ladder 10 may support slats 11 by means of cross bars 12 secured to vertical tapes 13. These tapes may include a reinforcement, for example of fabric 14, which is entirely surrounded or enclosed by plastic material 15 that forms a smooth waterproof surface on the outside thereof. The cross bars 12 may be in two segments 12a and 12b that are welded together for example at 12c. An aperture 16 may be provided in each cross bar 12 through which a lifting cord 17 may pass for actuation of the Venetian blind in a well known manner.

Illustrated in Fig. 2 is a modified form of cross tape 18 that differs from the cross tapes of Fig. 1 in that they are only fractionally as wide as vertical tapes 19 to which they are attached. These cross bars 18 are preferably staggered so that a lifting cord 21 may pass between them, and for this reason no aperture is required in the cross tapes as illustrated at 16 in Fig. 1. The cross bars 18 of Fig. 2 are likewise formed in two portions 18a and 18b which may be cemented, welded, fused, or otherwise bonded, as at 18c.

As mentioned previously, our invention incorporates the formation of fractional length cross bars upon the vertical tapes so that thereafter two such sub-assemblies may be joined together. According to one form of our invention, the fractional length cross bars may be separately formed and may be glued or otherwise bonded to the vertical tapes. Such a construction is shown in Fig. 3, wherein it will be noted that a vertical tape 22 may have a stub or fractional length cross bar 23 adapted to be attached thereto. The cross tape 23 may have an enlarged base 24 and a tapered end 25. The enlarged base 24 may be moved into engagement with the vertical tape 22 and the base may thereafter be properly bonded to the vertical tape 22 in any suitable fashion, for example by cementing, solvent fusing, heat fusing, or welding.

A completed sub-assembly of vertical tape and fractional cross bar is illustrated in broken outline in Fig. 3, and it will be apparent that when the two completed sub-assemblies are moved toward each other so that their tapered cross bar tips overlap, the entire Venetian blind ladder may be completed by bonding together the cross bar tips.

The use of fractional length cross bars in contrast to full length cross bars results in extreme ease of attachment of the ends of the cross bars to the vertical tapes. Thus this assembly operation may be performed with complete freedom of manipulation and inspection unhampered by the presence of a companion vertical tape. Thereafter a simple single joining operation of the tips of the cross bars completes the ladder construction.

The completed sub-assemblies are shown in more detail in Fig. 4, and there it will be noted that each base 24 of the fractional length cross bar 23 may include an upper fillet 24a and a lower fillet 24b. These fillets not only provide a broad base by which the fractional cross tape may be secured to the vertical tape 22, but also provide the necessary distribution of bending stresses within the cross tape so that there are no localized failures of the cross tapes. Thus the fillet structure serves a double function; namely, the elimination of juncture failures as well as the provision of a broad base by which the fractional cross tape may be secured to a vertical tape.

Illustrated in Fig. 6 is one form of extruded section that may be employed as a source of fractional cross tapes incorporating our invention. Accordingly an elongated strip 25 may have a cross section similar to the fractional cross bar 23 of Figs. 3 and 4, and this extruded section 25 may be cut along lines 25a to form the cross tapes 23. If fractional width cross tapes are desired as illustrated in Fig. 2, the sections will, of course, be much narrower, and in this event the extruded section 25 need not be punched or clipped to form lifting cord apertures such as those illustrated at 16a in Fig. 4.

Illustrated in Fig. 5 is a section of Venetian blind ladder constructed in accordance with a modified form of our invention; namely, the use of integrally molded fractional cross tapes. Accordingly a pair of vertical tapes 26 may have the plastic component thereof molded upon a fabric base 27 or upon other suitable reinforcements, and at the same time a fractional cross tape 28 may be molded at spaced intervals along the vertical tapes 26. These two identical tape sections may then be joined at the cross bar tips as at 29 so as to complete the ladder assembly. According to the embodiment of Fig. 5, therefore, the cross tapes may be integrally molded and the assembly of the ladder may be completed by bonding together the tips of the fractional cross bars.

Illustrated in Fig. 7 is a second modification of our invention wherein plastic cross tapes 31 may be bonded or adhered directly to fabric vertical tapes 32. This may be done by either molding the cross tapes 41 directly onto the fabric 32, or by separately gluing or otherwise adhering the materials together, or may be performed by any other suitable process.

In summary, the method steps incorporating our invention include forming fractional length cross bars on vertical tapes to form a sub-assembly of one vertical tape and a plurality of fractional cross tapes. The next step may include the joining together of the tips of the fractional length cross bars by any suitable process. A specific method of carrying out the basic forming method includes the separate forming of the cross bars which may later be bonded to the vertical tapes. A second specific method includes the integral molding of the cross tapes to the plastic of the vertical tapes and thereafter joining the ends. After a pair of ladders is completed, slats may be disposed on the cross bars and lifting cords may be threaded through the slats to complete the assembly of the Venetian blind.

Any suitable type of plastic material may be employed, for example vinyl chloride, acetates, polyvinyl butyral, nylon-type resins, various rubber compounds, and various other types of compounds. The main requirement is flexibility at normal operating temperatures as well as fairly long life. The stretch normally inherent in plastic tapes under stress is resisted by the fabric reinforcements illustrated, and it will be obvious that these could be threads of any suitable material. Likewise it will be apparent to those skilled in the art that various color combinations are possible between the vertical tape plastic and its reinforcing fabric, as well as between the fabric, the coating for the fabric, and the material of the cross bars. While it may be desirable to reinforce some types of cross bars, we have not found that it is necessary.

We have described our invention as utilizing plastic materials, and while these plastics may be generally defined as "organic" plastics, we do not limit ourselves to the usual carbon chemistry compounds, but include instead all types of useful plastic material including the silicon base compounds which may or may not be considered as organic or within the scope of carbon chemistry.

While we have described our invention with reference to specific embodiments thereof, we do not limit ourselves to these embodiments, inasmuch as modifications could be made therein without departing from the true spirit and scope of our invention. For this reason it will be apparent that the disclosures of this application are merely illustrative and not definitive of our invention.

We claim:

1. A method of fabricating Venetian blind ladders from plastic materials comprising: forming a pair of vertical plastic tapes with a plurality of fractional length plastic cross bars attached at longitudinally spaced intervals to the inner surfaces thereof, bringing said tapes into parallel proximity with one another, with said inner surfaces face to face and with the cross bars of one tape aligned with the cross bars of the other tape, and then bonding together the aligned ends of corresponding cross bars on the two tapes to form a complete ladder.

2. A method of fabricating Venetian blind ladders comprising: separately forming a tape and a plurality of fractional length plastic cross bars, attaching said cross bars to one side of said tape at longitudinally spaced intervals along the tape, bringing two of such tapes into close proximity with one another, with said sides face to face and with said cross bars of one tape aligned with the cross bars of the other tape, and then bonding the aligned ends of corresponding fractional cross bars on the two tapes to form a complete ladder.

JOSEPH L. HUNTER.
THOMAS A. MARTIN.

REFERENCES CITED

The following references are of record in the file of this patent:

UNITED STATES PATENTS

| Number | Name | Date |
| --- | --- | --- |
| 1,970,755 | Knoll | Aug. 21, 1934 |
| 2,047,230 | Schneider | July 14, 1936 |
| 2,220,545 | Reinhardt | Nov. 5, 1940 |
| 2,276,004 | Vidal et al. | Mar. 10, 1942 |
| 2,277,590 | Howard | Mar. 24, 1942 |
| 2,378,801 | Sidell et al. | June 19, 1945 |
| 2,388,297 | Slaughter | Nov. 6, 1945 |
| 2,405,579 | Hunter | Aug. 13, 1946 |
| 2,457,442 | Brent | Dec. 28, 1948 |